United States Patent [19]

Morris

[11] 4,122,964

[45] Oct. 31, 1978

[54] REUSABLE CLOSURES FOR HERMETICALLY SEALING CONTAINERS

[76] Inventor: Neal R. Morris, 5990 Hunter, Ventura, Calif. 93003

[21] Appl. No.: 848,010

[22] Filed: Nov. 3, 1977

Related U.S. Application Data

[63] Continuation of Ser. No. 702,249, Jul. 2, 1976, abandoned.

[51] Int. Cl.² ............................................. B65D 41/02
[52] U.S. Cl. ................................. 215/260; 215/200; 215/270; 215/276; 215/349; 428/64
[58] Field of Search ............... 215/200, 260, 270, 274, 215/275, 276, 347, 349; 428/64, 66

[56] References Cited

U.S. PATENT DOCUMENTS

| | | | |
|---|---|---|---|
| 2,008,593 | 7/1935 | Pedersen | 215/276 |
| 2,319,849 | 5/1943 | Crabbe | 215/260 |
| 2,449,014 | 9/1948 | Shaffer | 215/260 |
| 3,061,130 | 10/1962 | Husum | 215/347 |
| 3,157,564 | 11/1964 | Tucker | 428/517 X |
| 3,424,329 | 1/1969 | Hershberg | 215/247 |

*Primary Examiner*—Donald F. Norton

[57] ABSTRACT

A semi-rigid, deflectable reusable lid in the shape of a disk and formed of a non-porous material is adapted to hermetically seal the open mouth of a container. The lid is positioned over the mouth of the container to be sealed and is retained in position by a threaded band. The inner lid surface adjacent the perimeter of the lid is elastomeric or pliable and is adapted to be depressed by the rim of the container during the cooling interval of the usual food processing cycle to provide a seal between the inner surface of the lid and the rim of the container. When the container is sealed, the central portion of the lid is drawn partially inwardly into the open mouth by the reduced pressure within the container. The lid may be formed of one or more types of suitable material to achieve the deflectable and sealing characteristics desired. In one embodiment the central portion of the lid is deflected outwardly in the shape of a dome when not in use and is deflected inwardly in the shape of a cup when the container is sealed.

24 Claims, 6 Drawing Figures

REUSABLE CLOSURES FOR HERMETICALLY SEALING CONTAINERS

This is a continuation, of application Ser. No. 702,249 filed 7/2/76, and now abandoned.

BACKGROUND OF THE INVENTION

The present invention relates to hermetic sealing, and in particular to semi-rigid, deflectable closures for sealing containers.

A variety of methods are in use in the canning, preserving, and food processing field, both in industry and in the home, for closing and hermetically sealing containers, such as Mason jars. The advantages and disadvantages of any particular sealing method are determined by such factors as the cost of the containers and closures, the nature of the product to be canned, convenience to the users, and economies achieved by mass production. The advantages and disadvantages of a number of these methods are discussed below.

One early method employed a metal screw cap having a porecelain inner linear adapted to be used with a thin, flat annular rubber gasket to seal the mouth of the conventional Mason jar. After sterilization, the annular rubber gasket is placed on the sealing rim of the jar to be sealed. The metal cap is screwed tight and then turned back about one-quarter of a turn. The container and its contents are then processed, using either steam pressure or boiling water in the conventional manner depending in part on the product to be canned. During the processing cycle, the hot gases formed within the container are vented over the gasket and out under the cap. Immediately after processing and while the container and its contents remain hot, the metal screw cap is firmly tightened upon the rubber gasket to form the hermetic seal.

This technique has a number of disadvantages, foremost of which is the high cost of the metal screw caps, which are usually plated or zinc-lined. Additionally, the poreclain liners are susceptible to breakage, as well as to separation of the liners from the cap.

Related to the above canning method is the use of glass disk closures together with annular rubber gaskets for sealing non-threaded jars which have toggle-acting wire clamps. After sterilization, the rubber gasket is placed upon the sealing rim of the jar and the solid glass closure is placed over the open mouth of the jar and upon the gasket. The wire clamp is positioned in place but not locked. Immediately after processing and venting, the wire clamp is pressed down into its locked position, thereby applying compressive force upon the rubber gasket to achieve hermetic sealing.

The disadvantages of the glass disk closures are their high cost, their susceptibility to breakage, and the requirement of special wire clamp jars.

Another technique is the plated screw cap with a plastic annular inner liner or ridge. This cap is adapted to be tightly screwed into position over the mouth of the container to achieve a pressure sealing contact with the rim of the container. The processing and venting procedure is the same as described above with the early porcelain lined caps, and the plastic annular liner must be hermetically sealed to the inside of the cap if an acceptable seal is to be achieved. The advantage of this sealing method is the ease of reclosing the container after the original seal has been broken to provide protection for a limited period of time to the contents of the container until such contents are consumed. The relatively low cost of these plastic lined caps justifies their disposed after use and their re-use generally is not recommended due to degradation of the liner.

In the canning of certain types of products, where the item has a natural immunity to spoilage or has been treated to resist deterioration, metal screw caps with coated cardboard inserts are used. While the seal between the cardboard insert and the rim of the jar may not be entirely secure over a long period of time, its low cost makes this technique attractive. This apparatus is not acceptable for canning.

A related technique is the use of a thin, non-porous paper which is placed over the open mouth of and cemented to the rim of the container. A metal screw cap placed over the sealed container protects the thin paper closure. The low cost of this technique for sealing certain products accounts for its wide popularity, but again it is not suitable for canning.

A widely used method of canning in the food processing industry employs the self-sealing, metal lid with an annular inner sealant or adhesive. The acceptance of this technique is based upon its low cost and upon the ease by which the container may be hermetically sealed in an automatic or semi-automatic fashion during the normal processing cycle. The metal lid is formed as a thin disk having a slightly rolled edge adapted to surround the open mouth of the container adjacent the rim to prevent lateral movement of the lid. A ring of heat-sensitive sealant or adhesive is applied to the inner surface of the metal lid adjacent its perimeter to provide for a sealing contact with the rim of the container. The cleaned metal lid is placed upon the jar to be sealed and a screw band or annular clamp is fastened in place. The jar with its contents is then processed in the conventional manner. After processing, the sealed jar is left to stand overnight. By virtue of the slow cooling of the jar and its contents, the pressure reduces within the jar causing the lid to be retained against the rim and the hermetic seal to be maintained. After the jar has cooled, the screw band may be removed.

While the cost is relatively low, a number of disadvantages exist with this method. First, by virtue of the use of a heat-sensitive sealant, normal venting can occasionally cause improper radial movement of the sealant at unpredicatable locations around the lid resulting in tiny cracks which may not fully close during the cooling cycle as the pressure within the container reduces. Since the sealant functions as an adhesive, the lid is held tightly in place even though a hermetic seal may not have been achieved. Secondly, the stiffness of the metal lid is such that very little depression of its center portion occurs even with proper hermetic sealing, and visual inspection of the lid may not reveal the condition of the seal. In addition, once the central portion of the metal lid has become depressed, it tends to set and retain its shape whether or not a hermetic seal is maintained. Finally, the metal lid, even though plated, is frequently found to have oxidized leaving traces of contaminant upon the inner surface of the lid.

With the canning methods described above, the undamaged glass containers, glass disk closures, and heavy metal screw caps with porcelain liners may be reused. However, the annular rubber gaskets, the plasticized metal screw caps and the adhesive-sealing lids are discarded after use. The coated cardboard inserts and the cemented non-porous paper closures mentioned above are destroyed when the seal is broken. Each of these methods possesses the inherent disadvantage that not all of the structural elements needed for acceptable sealing are reusable.

Another universal disadvantage with these prior art sealing methods is the lack of a quick, simple, and reliable method of determining whether or not an acceptable hermetic seal has been achieved and will be maintained. The usual procedure of immersion in water after a suitable waiting period to test for air-leaks is time-consuming and costly. In addition the closures mentioned are burdened by the high cost of manufacturing.

It is a principal object of the present invention to provide an improved lid for sealing containers that is comprised of non-porous, non-corrosive and rust-free material which may be extensively reused, will provide a visual indication of the existence of a hermetic seal, and is inexpensive to manufacture.

SUMMARY OF THE INVENTION

A semi-rigid, deflectable lid is provided to hermetically seal the open mouth of a container. The lid comprises a disk of non-porous material having a central portion sufficiently flexible to be drawn partially inward into the open mouth of the container when the pressure within the container is less than the pressure external to the container. The disk has a sufficiently pliable inner surface adjacent the perimeter of the disk to be depressed by the rim of the open mouth container to provide a hermetic seal between the inner surface of the disk and the container when the central portion of the disk is drawn into the container. The deflection of the central portion of the disk provides a visual indication of the existence of the hermetic seal.

BRIEF DESCRIPTION OF THE DRAWINGS

The invention may best be understood when considered in light of the following detailed description taken in conjunction with the accompanying drawing wherein.

DESCRIPTION OF THE INVENTION

Figure 1:
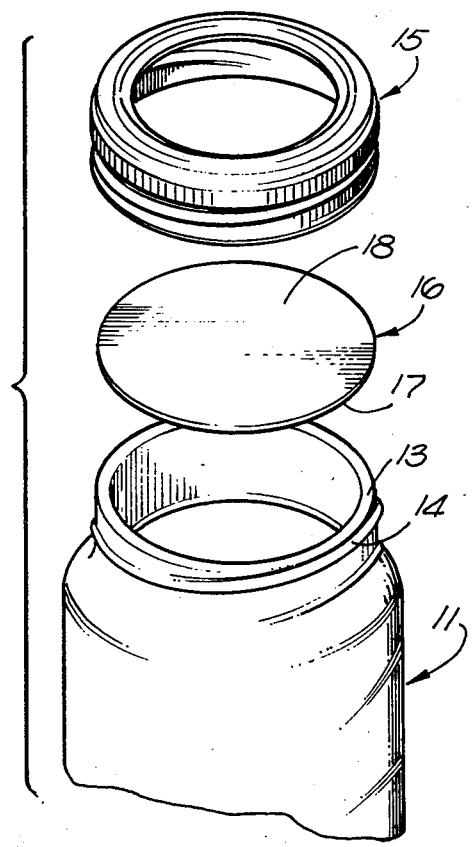
FIG. 1 is a perspective view of the lid of the first embodiment of the invention located between the screw band and the glass container.

Referring to FIG. 1, a conventional glass container or jar 11 having an open mouth 12 and a smooth, flat annular rim 13 is illustrated in perspective as representative of one type of container with which the present invention is particularly adapted to be employed. Container 11 is provided with threads 14 for engaging the threads of the conventional screw band or ring 15.

The open mouth 12 of container 11 is adapted to be hermetically sealed by the lid 16 of the present invention, which in this first embodiment is a thin, flat disk having a lower or inner surface 17 and an upper or outer surface 18. Lid 16 may be placed over the open mouth 12 and in contact with rim 13 before the screw band 15 is applied or, alternatively, the lid 16 may be placed in the band 15, before the band is partially screwed onto the container prior to processing and sealing.

In accordance with the invention, lid 16 may take a variety of forms, each of which possesses the particular characteristics that have been found to provide the improved hermetic seal. A hermetic seal as used herein includes a vacuum seal. The inner surface 17 of the lid is composed of a non-porous material extending over the entire inner surface 17 of the lid 16. The portion of the inner surface 17 adjacent the perimeter of the lid is composed of an elastomeric material having a resilient and pliable characteristic particularly adapted to be depressed by the annular rim 13 to provide a hermetic seal and to return to its original elastomeric characteristic when the lid 16 has been removed from service. In the preferred embodiment of the invention, the non-porous elastomeric material extends over the entire inner surface 17 of lid 16, including the portion adjacent the perimeter of the lid. Polyisoprene has been found to possess the desirable nonporous, elastomeric, and heat resistant characteristics to form the inner surface 17. Polyisoprene is a type of synthetic rubber made by polymerizing isoprene and has the same basic composition as natural rubber.

The central portion of lid 16 possesses a semi-rigid though deflectable characteristic which is adapted to be drawn partially inward into the open mouth of the container when the pressure within container 11 is less than the pressure external to container 11. This pressure differential occurs during the conventional food processing cycle as the container 11 and its contents are cooled. Proper selection of the material, such as polypropylene, for the central portion of the outer layer 18 of lid 16 will permit a deflection sufficient to provide a visual indication of the existence of this pressure differential which is necessary to provide and maintain a hermetic seal, while at the same time preventing the lid from collapsing into the container.

Figure 2:
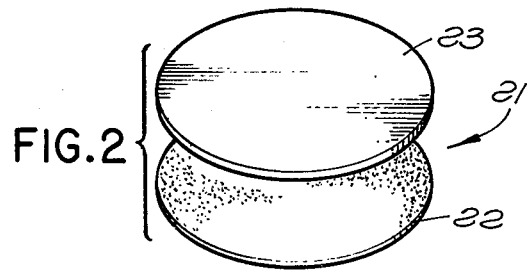
FIG. 2 is a perspective view of the two disk elements of the lid of the second embodiment of the invention.
Figure 3:
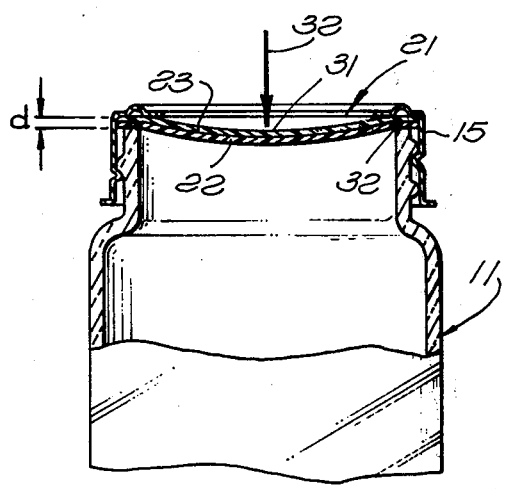
FIG. 3 is a cross-sectional, elevational view showing a container sealed by the lid of the second embodiment of the invention.

While lid 16 may be a unitized or integral unit, as illustrated in FIG. 1, formed by bonding or vulcanizing a layer of polyisoprene with a layer of hard, stiff rubber, or by encapsulating a central disk or matrix of semi-rigid material during the vulcanization of the polyisoprene, the present preferred form is the second embodiment shown in FIGS. 2 and 3. As a result of its lower manufacturing cost, the preferred lid 21 shown in FIG. 2 includes two substantially flat circular inner and outer disks 22 and 23 composed of different materials. The lower or inner disk 22, forming the inner surface of lid 21, may be polyisoprene and the upper or outer disk 23, forming the outer surface of lid 21, may be polypropylene. The two circular disks 22 and 23 may be securely attached to each other or may be removably joined together, as by wetting the adjacent disk surfaces, just prior to use.

The material forming disk 22 is not limited to polyisoprene, and any high quality elastomeric material, such as silicon rubber or the like, having a non-porous, resilient and limber characteristic capable of withstanding the high temperatures used in steam pressure food processing and, after use, being capable of returning to its original shape may be acceptable. One acceptable alternative is the inorganic elastomer known in the trade as silicone rubber.

The material forming disk 23 is not limited to polypropylene but may be composed of any suitable semi-rigid material capable of withstanding the temperatures used in steam pressure food processing without a deterioration of its shape, resilient or elastic properties. The material should be capable of returning to its original flat shape in the event that a hermetic seal is not achieved during processing or if the seal is destroyed during storage or shipment. One acceptable substitute is the polymer "Nylon 11". A preferred lid constructed in accordance with the second embodiment employs a polyisoprene disk 22 thirty-two thousandths of an inch thick and a polypropylene disk 23 forty thousandths of an inch thick.

Referring now to FIG. 3, container 11 is shown sealed by the lid of the second embodiment of this invention, it being understood that either lid 16 of FIG. 1 or lid 21 of FIG. 2 may be used. Sealing occurs during the normal food processing cycle in the following manner. After the jar 11, lid 21, and band 15 have been thoroughly cleaned and the jar filled with its contents, the lid 21 and band 15 are placed in position over the mouth 12. The two disks 22 and 23 should be joined together, as by wetting their adjacent surfaces, before use. Disk 22 is then positioned in contact with the rim 13. Band 15 is rotated to loosely press lid 21 against with rim 13. The lid should not tightly seal the jar 11 as it is necessary to allow venting of the hot gases and vapors from within the jar during processing. The jar, with the lid and band in place, is then processed either in a pressure cooker or in an open boiling water bath. Processing sterilizes the jar, its contents, the lid, and the band and vents the hot gases and vapors from within the jar out under the lid.

After processing, as the jar and its contents begin to cool an immediate seal is automatically formed. Within five to thirty minutes of cooling the existence of the seal is indicated by a gradual and ultimately appreciable and clearly discernible inward drawing or deflection of the central portion 31 of lid 21 as indicated below the arrow 32 and by the letter d indicating the amount of lid deflection in FIG. 3. Since the pressure within container 11 is appreciably less than external atmospheric pressure when the container with its contents has cooled to ambient temperature, the presence of a sustained deflection of the central portion 31 provides a reliable visual indication of the existence of a hermetic seal.

The reduced pressure within container 11 acts upon the entire inner disk 22 over the mouth 12 causing rim 13 to produce an annular depression within the inner pliable surface adjacent the perimeter of the lid. By virtue of the deflection of central portion 31 of the lid, maximum depression of the disk 22 occurs at the inside annular edge 32 of rim 13 adjacent the mouth 12.

A superior seal is achieved at the inside circular edge 32 of rim 13 as a result of the deflection of the central portion 31 where the edge 32 is substantially right angled since it is easier to seal against a relatively sharp edge in comparison to a rounded edge. Additionally, a superior seal is achieved because of a wiping action of the inner pliable surface of the lid in contact with rim 13 produced by the deflection of the central portion 31. This wiping action serves to clean away any small particles that might be present upon the surface of rim 13.

A further reason for the superior seal is the leverage action of the forces acting upon the inner pliable surface of the lid in contact with rim 13 produced by the deflection of the central portion 31. When the peripheral edge of the lid is held in a fixed horizontal position by band 15, the deflection of the central portion produces a downward force applied to the end of a lever arm extending from the disk 22 at the rim 13 to the center of the disk.

Another important reason for the superior sealing characteristics arises from the use of a disk of elastomeric, nonporous material which extends entirely over the mouth 12 of container 11. In this invention, the seal need be made only between the inner peripheral surface of the non-porous material adjacent the rim 13 and the rim 13 itself. In contrast, where annular or ring gaskets are employed as in the prior art, it is necessary that a seal exist not only between the lower or inner surface of the gasket and the rim of the container but also between the upper or outer surface of the gasket and the inside surface of the glass or metal lid.

With the superior seal obtained with the lid of the present invention, it is possible to loosen band 15 or to remove it entirely without rupturing the seal. Since the band was not firmly tightened during either the processing or cooling cycle, its removal is relatively easy and does not disturb the lid. The band serves primarily as a centering guide for the lid prior to processing and as a protective shield during handling and shipping after processing, and therefore may be composed of any material, such as an elastic material, which serves these purposes.

Hermetic sealing of lid of this invention may also be achieved without the necessity of a pressure cooker or a boiling water bath when the contents to be canned have been pre-cooked and remain at an elevated temperature. Under these conditions, the hot contents are poured into a prewarmed sterilized container and a sterilized lid, 16 or 21, is placed over the open mouth of the container. With the band 15 loosely in place, venting will occur in the normal manner as the hot gases and vapors escape out under the lid. After a minute or two, as the contents and the container begin to cool, venting is complete and the band 15 may be firmly tightened.

Figure 4:
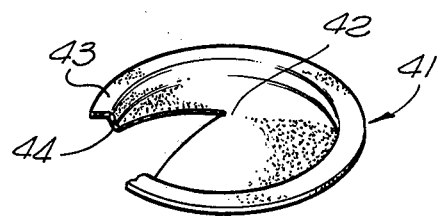
FIG. 4 is a perspective, partially broken-away view of a third embodiment of the invention.
Figure 5:
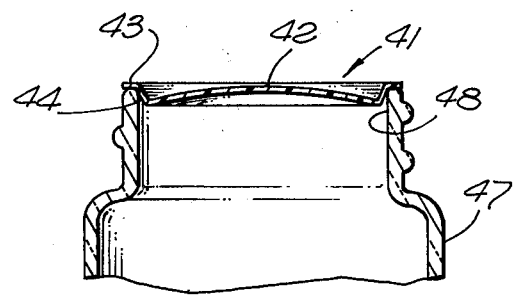
FIG. 5 is a cross-sectional, elevational view of the third embodiment of the invention of FIG. 4 in place over the mouth of the container before sealing; and, FIG. 6 is a cross-sectional, elevational view of a container sealed by the lid of FIG. 4.
Figure 6:
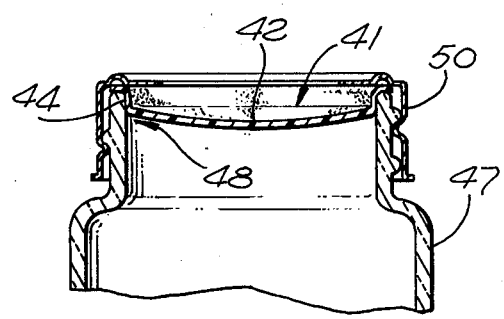

In the third embodiment of the lid of this invention, shown in FIGS. 4–6, the lid is formed of a suitable non-porous, pliable material to produce a U-shaped member. The lid 41 of this embodiment is molded or prestressed at high temperature to possess a central portion 42 which is normally deflected outward in the shape of a dome. The circular portion 43 of lid 41 adjacent its periphery is flat and is designed to rest upon the rim of the container to be sealed. The lid 41 is provided with a circular inwardly beveled portion 44, integral and contiguous with circular flat portion 43, to provide pressure sealing contact with the inside edge 48 of the mouth of the container to be sealed. A preferred material for lid 41 is one molded piece of the polymer polypropylene.

FIG. 5 shows the lid 41 in place over the mouth of a conventional container 47 prior to sealing. Processing and venting is accomplished in the same manner as described above. While a band is not always necessary to achieve hermetic sealing of the container 47 with lid 41, it is preferable to screw a band 50 loosely in place over the container mouth to provide a small downward force upon the circular flat lid portion 43 to insure that lid 41 remains in place during venting.

Cooling of container 47 causes a reduced pressure within the container which acts upon the inner non-porous surface of lid 41 to deflect the central portion 42 inwardly into the open mouth, and the central portion 42 changes from its prestressed domeshape to a cupshape as shown in FIG. 6. Hermetic sealing occurs between the pliable inner surface of the circular beveled portion 44 of lid 41 and the circular inside edge 48 of the mouth of container 47 adjacent the rim.

The improved lids shown and described herein are composed of non-corrosive and rust-free materials which may be extensively reused to hermetically seal containers. They are characterized by ease of production at relatively low cast without extensive tooling or machinery. They do not require the use of critical materials nor the consumption of large amounts of energy for manufacture. The improved lids produce a superior seal between the inner disk surface and rim or the inside edge of the container by using a non-porous, pliable material extending entirely over the mouth of the container. Venting of the containers using the lids of this invention can be performed safely during the processing cycle and without injury to the elastomeric property of the lids. Each of the lids disclosed provides a quick and highly reliable visual indication of the existence of a hermetic seal.

Although detailed embodiments of the invention have been disclosed herein, various other materials and configurations may be utilized in employing this invention, all within the scope of the claims. Consequently, the specific details disclosed herein describe the best presently known embodiments for purposes of disclosure and provide a basis for the claims herein which define the scope of the invention.

I claim:

1. A semi-rigid, deflectable lid adapted to hermetically seal the open mouth of a container, comprising:
   a disk of non-porous material having a central portion sufficiently flexible to be drawn partially inwardly into the open mouth of said container when the pressure within said container is less than the pressure external to said container; and,
   means for wiping and sealing said container open-mouth rim with said disk inner surface as said disk central portion is drawn inwardly into said container open mouth, the inward deflection of said disk central portion providing visual indication of a hermetic seal.

2. The semi-rigid, deflectable lid of claim 1 wherein said wiping and sealing means comprises a pliable disk inner surface adjacent said disk perimeter and covering said container rim.

3. The semi-rigid, deflectable lid as defined by claim 2 wherein said disk is comprised of a polymer material.

4. The semi-rigid, deflectable lid as defined by claim 3 wherein said disk is comprised of polypropylene.

5. The semi-rigid, deflectable lid as defined by claim 3 wherein said disk is comprised of rubber.

6. The semi-rigid, deflectable lid as defined by claim 3 wherein said disk is comprised of two types of polymer material, one type having a semi-rigid, deflectable characteristic forming the outer surface of said disk and the other type having a pliable, elastomeric characteristic forming the inner surface of said disk.

7. The semi-rigid, deflectable lid as defined by claim 6 wherein the two types of polymer material are removably joined together to form said disk.

8. The semi-rigid, deflectable lid as defined by claim 6 wherein the one type of polymer material forming the outer surface is polypropylene and the other type of polymer material forming the inner surface is polyisoprene.

9. A thin lid for hermetically sealing the open mouth of a container, comprising:

an inner substantially flat, circular disk, formed of a non-porous material having elastomeric characteristics, said inner disk being adapted to be positioned on the rim of said container and having a diameter larger than the diameter of said container open mouth;
an outer substantially flat, circular disk formed of a semi-rigid, deflectable material, said outer disk being adapted to be removably joined to said inner disk;
said inner disk inner surface providing means for wiping said container rim as said removably joined disks are drawn inwardly into said container open mouth due to reduced press internal to said container respective pressure external to said container; and,
said disk inner surface providing means for hermetically sealing said container as said removably joined disks are drawn inwardly into said container.

10. The lid of claim 9 further comprising means for visually indicating the existence of a hermetic seal, said visual indicating means comprising said outer disk material having elastomeric characteristics so that if said container internal pressure is equal to said external pressure, said outer disk will return to its original non-deflected shape.

11. A system for hermetically sealing containers, comprising:
   an open-mouth container;
   a thin, flat lid for sealing the mouth of said container;
   means for wiping the container rim as the central portion of said lid is deflected partially inwardly into the open mouth of the container by a reduced pressure within the container acting upon the inner surface of said lid; and,
   means for providing a visual indication of the presence of a hermetic seal.

12. The system of claim 11 further comprising an annular band located over the sealed mouth of said container and attached to the outside edge of said container adjacent to the rim, said band preventing inadvertent lateral movement of said lid.

13. The system of claim 11 wherein said lid is formed of two different materials joined together, one of the materials forming an inner flat surface of said lid and having a non-porous, elastomeric characteristic, and the other material having a semi-rigid, deflectable characteristic, said inner flat surface comprising said wiping means and said sealing means and being of a sufficient thickness to be continuously drawn across said container rim as said lid is drawn inwardly due to pressure reduction in said container.

14. The system of claim 13 wherein said visual indication means comprises said inwardly drawn lid, said inward deflection indicating a hermetic seal, the lack of said inward deflection indicating no hermetic seal.

15. In a system for hermetically sealing an open-mouth container with a lid, an improved lid comprising:
   a disk of non-porous material having a central portion sufficiently flexible to be drawn partially inwardly into the open mouth of said container when the pressure within said container is less than the pressure external to said container; and,
   means for wiping and sealing said container open-mouth rim with said disk inner surface as said disk central portion is drawn inwardly into said container open mouth, the inward deflection of said disk central portion providing visual indication of a hermetic seal.

16. the improved lid of claim 15 wherein said wiping and sealing means comprises a pliable disk inner surface adjacent said disk perimeter and covering said container rim.

17. The improved lid of claim 16 wherein said disk is comprised of a polymer material.

18. The improved lid of claim 17 wherein said disk is comprised of polypropylene.

19. The improved lid of claim 17 wherein said disk is comprised of rubber.

20. The improved lid of claim 17 wherein said disk is comprised of two types of polymer material, one type having a semi-rigid, deflectble characteristic forming the outer surface of said disk and the other type having a pliable, elastomeric characteristic forming the inner surface of said disk.

21. The improved lid of claim 20 wherein the two types of polymer material are removably joined together to form said disk.

22. The improved lid of claim 20 wherein the one type of polymer material forming the outer surface is polypropylene and the other type of polymer material forming the inner surface is polyisoprene.

23. A system for hermetically sealing containers, comprising:
an open-mouth container;
an inner substantially flat circular disk formed of a non-porous material having elastomeric characteristics, said inner disk being adapted to be positioned on the rim of said container and having a diameter larger than the diameter of said container open-mouth;
an outer substantially flat, circular disk formed of a semi-rigid, deflectable material, said outer disk being adapted to be removably joined to said inner disk;
said inner disk surface providing means for wiping said container rim as said removably joined disks are drawn inwardly into said container open-mouth due to reduced pressure internal to said container respective pressure external to said container; and,
said disk inner surface providing means for hermetically sealing said container as said removably joined disks are drawn inwardly into said container.

24. The enclosure of claim 23 further comprising means for visually indicating the existence of a hermetic seal, said visual indicating means comprising said outer disk material having elastomeric characteristics so that if said container internal pressure is equal to said external pressure, said outer disk will return to its original nondeflecting shape.

* * * * *

UNITED STATES PATENT AND TRADEMARK OFFICE
CERTIFICATE OF CORRECTION

PATENT NO. : 4,122,964

DATED : October 31, 1978

INVENTOR(S) : Neal R. Morris

It is certified that error appears in the above-identified patent and that said Letters Patent are hereby corrected as shown below:

Column 1, line 22 - "porecelian" should be --porcelain--.
Column 1, line 22 - "linear" should be --liner--.
Column 1, line 39 - "poreclaine" should be -porcelain--.
Column 2, line 1  - "disposed" should be --disposal--.
Column 8, line 14 - "press" should be --pressure--.
Column 8, line 31 - "mouth" should be --open mouth--.
Column 9, line 3  - "the" should be --The--.

Signed and Sealed this

Twenty-fourth Day of July 1979

[SEAL]

Attest:

LUTRELLE F. PARKER

*Attesting Officer*   *Acting Commissioner of Patents and Trademarks*